(12) United States Patent
Baidak et al.

(10) Patent No.: US 8,907,049 B2
(45) Date of Patent: Dec. 9, 2014

(54) THERMOSET RESIN COMPOSITIONS WITH INCREASED TOUGHNESS

(75) Inventors: Alexandre Baidak, Saffron Walden (GB); Claude Billaud, Marske-by-the-sea (GB)

(73) Assignee: Cytec Technology Corp., Wilmington, DE (US)

( * ) Notice: Subject to any disclaimer, the term of this patent is extended or adjusted under 35 U.S.C. 154(b) by 0 days.

(21) Appl. No.: 13/554,027

(22) Filed: Jul. 20, 2012

(65) Prior Publication Data

US 2013/0184376 A1     Jul. 18, 2013

(30) Foreign Application Priority Data

Aug. 1, 2011  (GB) .................................. 1113196.8

(51) Int. Cl.
| | |
|---|---|
| C08G 75/00 | (2006.01) |
| C08G 75/23 | (2006.01) |
| C08G 81/00 | (2006.01) |
| C08J 5/24 | (2006.01) |
| C08L 63/00 | (2006.01) |
| C08G 77/04 | (2006.01) |
| C08G 77/20 | (2006.01) |
| C08G 59/38 | (2006.01) |

(52) U.S. Cl.
CPC ............... *C08G 75/23* (2013.01); *C08G 81/00* (2013.01); *C08J 5/24* (2013.01); *C08L 63/00* (2013.01); *C08G 77/04* (2013.01); *C08G 77/20* (2013.01); *C08G 59/38* (2013.01); *C08J 2467/00* (2013.01); *C08J 2481/06* (2013.01); *C08J 2363/00* (2013.01)
USPC ........... 528/373; 525/418; 525/474; 525/451; 523/400

(58) Field of Classification Search
USPC ........... 523/400; 525/418, 474, 451; 528/373, 528/370, 125
See application file for complete search history.

(56) References Cited

U.S. PATENT DOCUMENTS

| | | | |
|---|---|---|---|
| 6,013,730 | A | 1/2000 | McGrail et al. |
| 6,046,257 | A | 4/2000 | Oosedo et al. |
| 6,265,491 | B1 | 7/2001 | Carter et al. |
| 6,437,080 | B1 | 8/2002 | McGrail et al. |
| 2004/0041128 | A1 | 3/2004 | Carter et al. |
| 2004/0044141 | A1 | 3/2004 | McGrail et al. |
| 2006/0077153 | A1 | 4/2006 | Cummings et al. |
| 2006/0252334 | A1 | 11/2006 | LoFaro et al. |
| 2009/0123759 | A1 | 5/2009 | Pham et al. |

FOREIGN PATENT DOCUMENTS

| | | |
|---|---|---|
| EP | 0056703 A1 | 7/1982 |
| EP | 0102158 A2 | 3/1984 |
| EP | 0102159 A2 | 3/1984 |
| EP | 0311349 A2 | 4/1989 |
| EP | 0365168 A2 | 4/1990 |
| EP | 0486197 A2 | 5/1992 |
| EP | 0524054 A1 | 1/1993 |
| EP | 0749987 A1 | 12/1996 |
| GB | 1139413 | 1/1969 |
| WO | 2006077153 A2 | 7/2006 |
| WO | 2007009957 A1 | 1/2007 |
| WO | 2010136772 A1 | 12/2010 |

OTHER PUBLICATIONS

Croda Priplast 3199 catalog, 2008.*
Di Hu et al: "Morphology and Thermomechanical Properties of Epoxy Thermosets Modified with Polysulfone-Block-Polydimethylsiloxane Multiblock Copolymer", Journal of Applied Polymer Science, vol. 119, No. 5, Mar. 5, 2011, pp. 2933-2944.
Ma C-C M et al: "Bisphenol-A Polycarbonate/Polydimethylsiloxane Multiblock Copolymers. I. Synthesis and Characterization", Journal of Applied Polymer Science, John Wiley & Sons, Inc., US, vol. 66, No. 1, Oct. 3, 1997, pp. 57-66.
International Search Report. PCT/GB2012/051779. Apr. 24, 2013.
Ashok Saxena and S.J. Hudak, Jr. International Journal of Fracture, vol. 14, No. 5, Oct. 1978, pp. 453-468.
Y. Zhang Macromol. Chem. Phys. 2005, 206, pp. 33-42.

* cited by examiner

*Primary Examiner* — Shane Fang
(74) *Attorney, Agent, or Firm* — Thi D. Dang

(57) ABSTRACT

A block copolymer (M) suitable for toughening a thermoset resin (R). The block copolymer (M) has at least one block derived from a thermoplastic aromatic polymer (A) which exhibits a glass transition temperature (Tg) of at least about 150° C., and at least one block derived from a low Tg polymer (B) wherein:
  (i) the low Tg polymer (B) exhibits a Tg in the range of from about −130° C. to about +40° C.;
  (ii) the aromatic polymer (A) is soluble in the uncured thermoset resin precursor(s) (P) of the thermoset resin (R), and
  (i) the low Tg polymer (B) is insoluble in the uncured thermoset resin precursor (P).

14 Claims, 2 Drawing Sheets

THERMOSET RESIN COMPOSITIONS WITH INCREASED TOUGHNESS

CROSS-REFERENCE TO A RELATED APPLICATION

This application claims benefit of priority to U.K. Application No. 1113196.8, filed Aug. 1, 2011.

BACKGROUND

This invention relates to the use of block copolymers to modify properties such as fracture toughness of thermoset resin compositions, particularly multifunctional highly cross-linked resin compositions. The invention is of particular utility in epoxy resin compositions. The invention also relates to the use of such thermoset resin compositions in fibre-reinforced composite materials and to structural parts made from such composite materials.

Thermoset materials such as cured epoxy resins have been known for their thermal and chemical resistance. They also display good mechanical properties but they frequently lack toughness and tend to be very brittle. This is especially true as their crosslink density increases or the monomer functionality increases above two. Attempts have been made to strengthen or toughen epoxy resins and other thermoset materials such as bismaleimide resins, benzoxazine resins, cyanate ester resins, epoxy vinyl ester resins and unsaturated polyester resins, and also blends of these, by incorporating therein a variety of elastomeric materials.

A disadvantage of prior art block copolymer toughening agents can be a reduction in the glass transition temperature of the resin composition, which can lead to a decrease in the service temperature of the modified and cured thermoset resin. The service temperature of material is directly correlated to the glass transition temperature of the material. It is described as the highest temperature at which a material can be used without any failure over an extended time period time (typically at least 5000 hours). The "failure" of the material is typically understood as the situation where a property value drops to 50% of its initial value (ASTM-D794). High service temperatures (for instance, around 150 to 160° C.) are required for use in aerospace or high-performance automotive applications, in which a component is required to retain shape and performance at elevated temperatures.

A further disadvantage prior art block copolymer toughening agents can be a reduction in the modulus of the resin.

For certain applications, the toughened resin must also exhibit good solvent resistance.

SUMMARY

It is an object of the present invention to provide modifying agents suitable for improving the toughness of thermoset resins (particularly highly cross-linked resins) which avoid or minimise reduction in the glass transition temperature (Tg) and/or the modulus of the resin.

It is a further object to provide modifying agents suitable for improving the toughness of thermoset resins (particularly highly cross-linked resins) which avoid or minimise reduction in the Tg and/or the modulus of the resin, wherein the thermoset resin exhibits good solvent resistance.

It is a further object to provide modifying agents suitable for improving the toughness of thermoset resins (particularly highly cross-linked resins) at relatively lower concentrations of toughening agent.

It is a further object to provide modifying agents suitable for improving the nano-structuration of thermoset resins (particularly highly cross-linked resins).

It is a further object to provide modifying agents for thermoset resin systems (particularly highly cross-linked resins) which exhibit good tack properties during the preparation of composite materials made therefrom.

It is a further object of this invention to provide a highly cross-linked, toughened thermoset resin composition without significant reduction of Tg and/or modulus, preferably wherein the resin exhibits good solvent resistance, and preferably wherein the resin exhibits improved tack properties and/or nano-structuration.

The avoiding or minimising of a reduction in the Tg is a particularly important aspect of these objectives.

DETAILED DESCRIPTION

Figure 1:
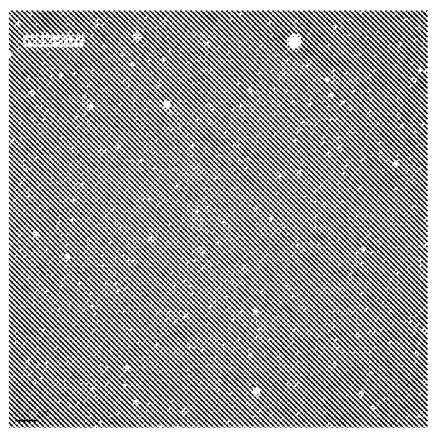
FIGS. 1-3 are micrograph images of toughened resin systems produced according to an example.

According to the present invention, there is provided a block copolymer (M) suitable for toughening a thermoset resin (R), said block copolymer (M) having at least one block derived from a thermoplastic aromatic polymer (A) which exhibits a glass transition temperature (Tg) of at least about 150° C., and at least one block derived from a low Tg polymer (B) wherein:
 (i) the low $T_g$ polymer (B) exhibits a Tg in the range of from about −130° C. to about +40° C.:
 (ii) the aromatic polymer (A) is soluble in the uncured thermoset resin precursor(s) (P) of said thermoset resin (R),
 (iii) the low Tg polymer (B) is insoluble in the uncured thermoset resin precursor (P).

The block copolymer (M) modifies the properties of the thermoset resin in an advantageous way, and hence is also referred to herein as a modifier.

According to a further aspect of the invention there is provided a thermoset resin system or curable polymer composition comprising the block copolymer (M) defined herein and one or more uncured thermoset resin precursor(s) (P), and optionally a curing agent therefor.

According to a further aspect of the invention there is provided a toughened thermoset resin composition (R) derived from the block copolymer (M) defined herein and one or more uncured thermoset resin precursor(s) (P), and optionally a curing agent therefor.

As used herein, a "curable polymer composition" refers to a composition prior to curing and a "thermoset resin composition" refers to a post-cured composition.

As used herein, the term "soluble" means that a first polymer A forms a mixture with a second polymer B wherein the mixture exhibits the same or substantially the same values of physical properties throughout the mixture, i.e. the mixture comprises an essentially single phase and/or is essentially homogeneous. Conveniently, solubility can be assessed by light scattering. For a polymer A which is soluble in polymer B, the addition of polymer A to polymer B results in essentially no change in light scattering. An essentially single phase mixture is characterised by high optical clarity. The boundary between an essentially single phase mixture and a mixture with two (or more) phases is defined by the "cloud point" which, for a given polymer blend, is defined as the temperature at which phase separation is observed. Optical clarity may be assessed on the macro-scale by eye.

The block copolymers of the present invention promote a morphology in the cured thermoset resins which resists fracture and imparts toughness. The block copolymers contain one type of block which is essentially soluble in the thermoset resin or precursor, and one type of block which is essentially insoluble in the thermoset resin or precursor. In a blend with the epoxy precursors, self-assembling block copolymers for thermoset nano-structuration of epoxy resin can dissolve or self-assemble. The epoxy-soluble segment promotes the dissolution of the block copolymer molecules while the epoxy-insoluble segment forces the block copolymer molecules out of solution and to self-assemble or organise at the nano-scale. The degree of organisation in ordered and disordered nano-structures depends on the nature of the block copolymer and its concentration. At low content, the block copolymers may exhibit a micellar arrangement in the resin. It is believed that the soluble block allows the toughening agent to dissolve during the resin preparation and to remain nano-organised in the thermoset resin effectively up to the gel-point temperature and throughout the cure cycle. The block copolymer molecules may be soluble in the resin precursor and only nano-organised upon the resin curing, prior to the gel point (i.e. reaction-induced micro-phase separation). Thus, the resin morphology is substantially driven by the block copolymer self-assembly, thereby reducing or eliminating the dependence on cure kinetics to induce a two-phase morphology. Gross (macroscopic) phase-separation is avoided. The self-assembly of the block copolymers of the present invention promotes the desired morphology and leads to the nano-structuration of the cured thermoset resin which in turn increases the fracture toughness. Thus, in the present invention, the insoluble domains or structures in the cured thermoset resin are desirably on the nano-scale (i.e. less than 1 µm, and preferably no more than 100 nm).

The block copolymer of the present invention utilises the solubility of the aromatic polymer block (A) in thermoset resins to enable the use of low Tg polymers as toughening agents in thermoset resins while avoiding or minimising reduction in Tg and/or modulus of the resin, in systems where the insolubility of the low Tg polymer in the thermoset resin had previously rendered such polymers unusable or inaccessible as toughening agents.

The block copolymers of the present invention toughen the thermoset resin while avoiding or minimising reduction in the Tg and/or modulus of the resin (relative to that of the neat resin). The retention of Tg means that the toughened thermoset resins of the present invention retain a high service temperature. In addition, the amount of toughening agent needed to impart a given toughness to the thermoset material is lower than for other thermoplastic toughening agents, including conventional high-performance thermoplastic tougheners.

In addition, the thermoset resin systems or curable polymer compositions comprising the block copolymers of the present invention exhibit advantageously improved tack properties.

The Thermoplastic Aromatic Polymer Block (A)

The aromatic polymer (A) has a relatively high Tg, which is one factor in the retention of the Tg of the cured thermoset resin. Thus, the Tg of the aromatic polymer (A) is at least about 150° C., preferably at least about 160° C., preferably at least about 170° C., preferably at least about 180° C., and in one embodiment at least about 190° C.

The thermoplastic aromatic polymer (A) comprises divalent aromatic radicals linked by linking groups including a carbon-carbon single bond (C—C bond), an ether group (—O—), a thioether or sulphide group (—S—), an ester group (—CO—O—), a thioester group (—CO—S—) or (—CS—O—), a carboxamide group (—CO—NH—), an imide group (>C=N—) or ((—CO—)$_2$N—), a sulphone group (—SO$_2$—), a ketone or carbonyl group (>C=O), a carbonate group (—O—CO—O—), a methylene group (—CH$_2$—), a difluoromethylene group (—CF$_2$—), a vinylidene group (—CH=CH—), and a 2,2-propylene group (>C(CH$_3$)$_2$). The polymer (A) may comprise one or more of said linking groups in the same polymer. Thus, the aromatic polymer. (A) is selected from the group consisting of polyethers, polyether sulphones, polyether imides, polyimides, polyether ketones, polycarbonates, polysulphones, polyketones, mixed poly-sulphone-ketones, mixed polyether sulphone-ketones, polyesters, polyetheresters, polyamides, polyetheramides, and polysulphides, as well as copolymers thereof. Preferred polymers (A) are selected from aromatic polyether sulphones, aromatic polyether ketones, aromatic polyether imides, and aromatic polysulphide-sulphones. It will be appreciated that an essential feature of the thermoplastic aromatic polymer (A) is the requirement that an aromatic radical lies within, rather than pendant to, the polymer backbone. Aromatic radicals which are pendant to the polymer backbone may optionally also be present in the thermoplastic aromatic polymer (A), provided that the polymer backbone comprises aromatic radicals. The aromatic radicals in the polymer backbone are at least divalent, and are typically divalent. As discussed further below, the aromatic radicals within the polymer backbone may carry one or reactive pendant and/or end group(s).

The divalent aromatic radicals are preferably 1,4-phenylene, 1,3-phenylene, 1,4- or 2,6-naphthylene, and phthalimid-N-4-ylene. Of particular utility are phenylene radicals, typically 1,4-phenylene. As used herein, the term "aromatic polymer" is a polymer wherein the mass fraction of aromatic diradicals that are linked together by the said linking groups in the polymer is at least 51%, preferably at least 60%.

Preferred aromatic polymers (A) are polyether sulphones, for instance poly-1,4-phenylene-oxy-1,4-phenylene-sulphone; the polyether sulphone made from bisphenol A and dichlorodiphenyl sulphone; and poly-bis(1,4-phenylene)-oxy-1,4-phenylene-sulphone. A further class of aromatic polymers (A) are polyetherimides (PEI), for instance the polymer made from bisphenol A, 4-nitrophthalic acid and m-phenylene diamine.

The thermoplastic aromatic polymer (A) preferably comprises one or more polyarylsulphone(s) comprising ether-linked repeating units, optionally further comprising thioether-linked repeating units, the units being selected from:

—[ArSO$_2$Ar]$_n$— and optionally from:

—[Ar]$_a$— wherein:
Ar is phenylene;
n=1 to 2 and can be fractional;
a=1 to 3 and can be fractional and when a exceeds 1, said phenylene groups are linked linearly through a single chemical bond or a divalent group other than —SO$_2$— (preferably wherein the divalent group is a group —C(R$^9$)$_2$— wherein each R$^9$ may be the same or different and selected from H and C$_{1-8}$ alkyl (particularly methyl)), or are fused together, provided that the repeating unit —[ArSO$_2$Ar]$_n$— is always present in the polyarylsulphone in such a proportion that on average at least two of said —[ArSO$_2$Ar]$_n$— units are in sequence in each polymer chain present, and wherein the polyarylsulphone has one or more reactive pendant and/or end group(s).

By "fractional" reference is made to the average value for a given polymer chain containing units having various values of n or a.

In one embodiment, the phenylene groups in the polyarylsulphones are linked through a single bond.

The phenylene groups in the polyarylsulphones may be substituted by one or more substituent groups, each independently selected from C$_{1-8}$ branched or straight chain aliphatic saturated or unsaturated aliphatic groups or moieties optionally comprising one or more heteroatoms selected from O, S, N, or halo (for example Cl or F); and/or groups providing active hydrogen especially OH, NH$_2$, NHR$^a$ or —SH, where R$^a$ is a hydrocarbon group containing up to eight carbon atoms, or providing other cross-linking activity especially benzoxazine, epoxy, (meth)acrylate, cyanate, isocyanate, acetylene or ethylene, as in vinyl, allyl or maleimide, anhydride, oxazoline and monomers containing unsaturation.

Preferably, the phenylene groups are meta- or para-(preferably para). A mixture of conformations (particularly meta- and para-conformations) may be present along the polymer backbone.

Preferably the polyarylsulphone comprises a combination of —[ArSO$_2$Ar]$_n$— and —[Ar]$_a$— repeating units, linked by ether and/or thio-ether linkages, preferably by ether linkages. Thus, preferably the polyarylsulphone comprises a combination of polyethersulphone (PES) and polyetherethersulphone (PEES) ether-linked repeating units.

The relative proportions of —[ArSO$_2$Ar]$_n$— and —[Ar]$_a$— repeating units is such that on average at least two —[ArSO$_2$Ar]$_n$— repeating units are in immediate mutual succession in each polymer chain present, and the ratio of —[ArSO$_2$Ar]$_n$— units to —[Ar]$_a$— units is preferably in the range 1:99 to 99:1, more preferably 10:90 to 90:10. Typically, the ratio [ArSO$_2$Ar]$_n$:[Ar]$_a$ is in the range 75:25 to 50:50.

In one embodiment, the preferred repeating units in the polyarylsulphones are:

—X—Ar—SO$_2$—Ar—X—Ar—SO$_2$—Ar— (referred to herein as a "PES unit") (I):

and

—X—(Ar)$_a$—X—Ar—SO$_2$—Ar— (referred to herein as a "PEES unit") (II):

wherein:

X is O or S (preferably O) and may differ from unit to unit; and the ratio of units I:II is preferably in the range of from 10:90 to 80:20, more preferably in the range of from 10:90 to 55:45, more preferably in the range of from 25:75 to 50:50, and in one embodiment, the ratio I:II is in the range of from 20:80 to 70:30, more preferably in the range of from 30:70 to 70:30, most preferably in the range of from 35:65 to 65:35.

The preferred relative proportions of the repeating units of the polyarylsulphone may be expressed in terms of the weight percent SO$_2$ content, defined as 100 times (weight of SO$_2$)/(weight of average repeat unit). The preferred SO$_2$ content is at least 22, preferably 23 to 25%. When a=1 this corresponds to PES/PEES ratio of at least 20:80, preferably in the range 35:65 to 65:35.

The flow temperature of polyetherethersulphone is generally less than that of a corresponding Mn polyethersulphone, but both possess similar mechanical properties. Accordingly the ratio may be determined, by determining values for a and n above.

U.S. Pat. No. 6,437,080 discloses processes for obtaining such compositions from their monomer precursors in a manner to isolate the monomer precursors in selected molecular weight as desired, and those disclosures are incorporated herein by reference.

The above proportions refer only to the units mentioned. In addition to such units the polyarylsulphone may contain up to 50% molar, preferably up to 25% molar, of other repeating units: the preferred SO$_2$ content ranges then apply to the whole polymer. Such units may be for example of the formula:

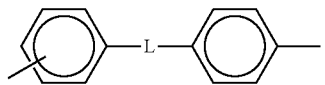

in which L is a direct link, oxygen, sulphur, —CO— or a divalent group (preferably a divalent hydrocarbon radical, preferably wherein the divalent group is a group —C(R$^{12}$)$_2$— wherein each R$^{12}$ may be the same or different and selected from H and C$_{1-8}$ alkyl (particularly methyl)).

When the polyarylsulphone is the product of nucleophilic synthesis, its units may have been derived for example from one or more bisphenols and/or corresponding bis-thiols or phenol-thiols selected from hydroquinone, 4,4'-dihydroxybiphenyl, resorcinol, dihydroxynaphthalene (2,6 and other isomers), 4,4'-dihydroxybenzophenone, 2,2'-di(4-hydroxyphenyl)propane and -methane. If a bis-thiol is used, it may be formed in situ, that is, a dihalide may be reacted with an alkali sulphide or polysulphide or thiosulphate.

Other examples of such additional units are of the formula:

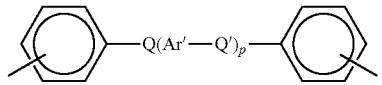

in which Q and Q', which may be the same or different, are CO or SO$_2$; Ar' is a divalent aromatic radical; and p is 0, 1, 2, or 3, provided that p is not zero where Q is SO$_2$. Ar' is preferably at least one divalent aromatic radical selected from phenylene, biphenylene or terphenylene. Particular units have the formula:

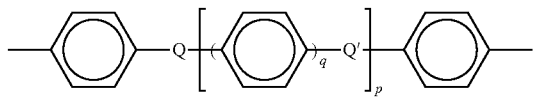

where q is 1, 2, or 3. When the polymer is the product of nucleophilic synthesis, such units may have been derived from one or more dihalides, for example selected from 4,4'-dihalobenzophenone, 4,4'bis(4-chlorophenylsulphonyl)biphenyl, 1,4,bis(4-halobenzoyl)benzene and 4,4'-bis(4-halobenzoyl)biphenyl. They may of course have been derived partly from the corresponding bisphenols.

The polyarylsulphone may be the product of nucleophilic synthesis from halophenols and/or halothiophenols. In any nucleophilic synthesis the halogen if chlorine or bromine may be activated by the presence of a copper catalyst. Such activation is often unnecessary if the halogen is activated by an electron withdrawing group. In any event, fluoride is usually more active than chloride. Any nucleophilic synthesis of the polyarylsulphone is carried out preferably in the presence of one or more alkali metal salts, such as KOH, NaOH or $K_2CO_3$ in up to 10% molar excess over the stoichiometric.

As noted above, the polyarylsulphone contains one or more reactive pendant and/or end-group(s), and in a preferred embodiment the polyarylsulphone contains two such reactive pendant and/or end-group(s). In one embodiment, the polyarylsulphone comprises one such reactive pendant- and/or end-group. Preferably, the reactive pendant- and/or end-groups are groups providing active hydrogen, particularly OH, $NH_2$, $NHR^b$ or —SH (where $R^b$ is a hydrocarbon group containing up to eight carbon atoms), or are groups providing other cross-linking activity, particularly benzoxazine, epoxy, (meth)acrylate, cyanate, isocyanate, acetylene or ethylene, as in vinyl, allyl or maleimide, anhydride, oxazaline and monomers containing saturation. In one embodiment, the reactive pendant- and/or end-groups are of formula -A'-Y wherein A' is a bond or a divalent hydrocarbon group, preferably aromatic, preferably phenyl. Examples of Y are groups providing active hydrogen, particularly OH, $NH_2$, $NHR^b$ or —SH (where $R^b$ is a hydrocarbon group containing up to eight carbon atoms), or groups providing other cross-linking activity, particularly benzoxazine, epoxy, (meth)acrylate, cyanate, isocyanate, acetylene or ethylene, as in vinyl, allyl or maleimide, anhydride, oxazaline and monomers containing saturation. The groups providing other cross-linking activity may be bound to the Ar groups of the polyarylsulphone via a direct bond, or via an ether, thioether, sulphone, —CO— or divalent hydrocarbon radical linkage as described hereinabove, most typically via an ether, thioether or sulphone linkage. In a further embodiment, the end-groups, but preferably no more than a relatively minor proportion thereof, may be selected from halo groups (particularly chloro). Reactive end-groups may be obtained by a reaction of monomers or by subsequent conversion of product polymers prior to, or subsequently to, isolation. In one method for the introduction of reactive pendant and/or end-groups, for instance using activated aromatic halogenides dichlorodiphenylsulphone) as the starting material for the polymer, the synthetic process utilises a slightly more than stoichiometric amount of the activated aromatic halogenide, and the resulting polymer having terminal halogenide groups is then reacted with an aminophenol (e.g. m-aminophenol) to create amino end groups.

The reactive pendant- and/or end-group(s) of polymer (A) is/are preferably selected from groups providing active hydrogen, particularly OH and $NH_2$, particularly $NH_2$. Preferably, the polymer comprises two such groups.

The block copolymer (M) may be derived from a mixture of polyarylsulphones having differing end-groups. In one embodiment, where the polyarylsulphones comprise a plurality of end-groups, at least 50 mol %, preferably at least 60 mol %, preferably at least 70 mol %, preferably at least 80 mol %, preferably at least 85 mol %, and preferably at least 90 mol % of the end-groups will be of one type.

The number average molar mass $M_n$ of the aromatic polymer (A), particularly the preferred polyarylsulphones, is suitably in the range from about 2,000 to about 60,000, preferably from about 2,000 to about 30,000, preferably from about 2,000 to about 15,000, and in one embodiment from about 3,000 to about 10,000 g/mol.

The synthesis of the thermoplastic aromatic polymers (A) is further described in US-2004/0044141 and U.S. Pat. No. 6,437,080, and those disclosures are incorporated herein by reference.

In a block copolymer (M) comprising a plurality of blocks of the polymer (A), each of the blocks of polymer (A) may be the same or different. For instance, the molecular weight of each polymer block may be the same or different, or may be defined by a molecular weight range or polydispersity index (PDI). Typically, the polymer blocks (A) present in the block copolymer are defined by a single molecular weight range or polydispersity index (PDI). The chemical identity of the polymer backbone of each polymer (A) may be the same or different, but is preferably the same for each block of polymer (A). As used herein, the term "chemical identity of the polymer backbone" refers to the functional chemical groups which join the monomeric units of the polymer, for instance, polyether, polyester, a polyethersulphone, polyetherethersulphone and the like. Where present, the substituent groups on each of the polymer blocks (A) may be the same or different.

The Low Glass Transition Temperature (Tg) Polymer (B)

The characteristic properties of the low Tg polymer (B) used in the present invention are the low Tg and the limited solubility in the uncured thermoset resin precursor (P). The polymer (B) typically also exhibits limited solubility in the aromatic polymer (A) of the block copolymer, and in the cured thermoset resin (R).

The polymer (B) preferably exhibits a Tg in the range of from −130° C. to about 40° C., and in one embodiment in the range of from −80° C. to about 0° C., and in one embodiment from about −80° C. to about −30° C.

The low Tg polymers B of the invention, which are normally elastomeric, are preferably saturated aliphatic polyesters derived from at least divalent linear, branched or cyclic aliphatic alcohols having from 2 to 60 carbon atoms, and at least divalent linear, branched or cyclic aliphatic carboxylic acids having from 3 to 60 carbon atoms, with the proviso that at least one (and in one embodiment both) of the alcohol or the acid components has at least 4 carbon atoms, preferably at least 6, more preferably at least 12, and most preferred at least 18 carbon atoms. If the polyester is derived from more than one alcohol and/or more than one acid, the minimum of four carbon atoms applies to the average number of carbon atoms in the alcohol or acid component. It is also preferred that the polyester has a mass fraction of not more than 10% of aromatic moieties.

In one embodiment, at least one, and preferably both, of the aliphatic alcohol component and the aliphatic acid component, have from 20 to 60 carbon atoms.

In one embodiment, the polyester is derived from aliphatic dicarboxylic acids and aliphatic dihydric alcohols, of the chain lengths described hereinabove.

Preferred diacids are the so-called dimer fatty acids, usually having from 12 to 48 carbon atoms. Preferred alcohols are dihydric alcohols having from 2 to 6 carbon atoms, preferably 4 to 6 carbon atoms, preferably butane-1,4-diol and hexane-1,6-diol. Preferred saturated aliphatic polyesters are derived from such dimer fatty acids and dihydric alcohols. Alternatively, the saturated aliphatic polyester may be derived from dimer alcohols having from 12 to 48 carbon atoms with low molecular weight diacids (preferably having from 2 to 6 carbon atoms, preferably 4 to 6 carbon atoms, such as adipic acid).

Another class of low Tg polymers suitable for use in the present invention are polysiloxanes, defined herein as polymers having a —O—($SiR^1R^2$—O)— repeating unit, where $R^1$ and $R^2$ are independently selected from $C_{1-8}$ alkyl residues or aryl residues. Representative examples are polydimethyl siloxane homo- and co-polymers, also known as silicone rubbers, and which have a glass transition temperature of down to about −130° C., and typically no higher than about −10° C.

A further class of low Tg polymers suitable for use in the present invention are polybutylacrylates, which can be prepared by methods known in the art. Functionalised polybutylacrylates include hydroxyl-terminated polybutylacrylate, which can be synthesised by atom transfer radical polymerisation (as described in Macromol. Chem. Phys. 2005, 206, 33-42).

A further class of low Tg polymers suitable for use in the present invention are the poly(dienes), for instance poly(dienes) obtainable by polymerisation of butadiene ($C_4$ repeat unit) or isoprene ($C_5$ repeat unit). Examples include functionalised poly(dienes) such as hydroxyl-terminated polybutadienes and hydrogenated hydroxyl-terminated polybutadienes preferably having a molecular weight from about 2000 to about 10000 g/mol (available commercially as Krasol™ from Cray Valley). Other functionalised poly(dienes) include anhydride-functionalised polybutadienes (available commercially as Ricon™ from Cray Valley); and carboxylic acid-terminated polybutadienes (available commercially as Hycar™ from Noveon).

A further class of low Tg polymers suitable for use in the present invention are the polyethers, of general chemical structure —(O—R—)$_n$, in which R is preferably selected from $C_3$ and $C_4$ hydrocarbyl (i.e. polyoxypropylene and polyoxytetramethylene), which may be, for instance, hydroxyl- or amine-terminated. Examples include hydroxyl-terminated polyoxytetramethylene (available commercially as Terathane®; Invista); polyoxypropylene diol (available commercially as Voranol™ 220-28; Dow); and amine-terminated polyoxypropylene (available commercially as Jeffamine™ D4000; Hunstman).

In a preferred embodiment, the number average molar mass $M_n$ of the of the low Tg polymer B is in the range of from about 1,000 to about 30,000 g/mol, typically from about 1,000 to about 20,000 g/mol, more typically from about 1,000 to about 10,000 g/mol, more typically from about 2,000 to about 9,000 g/mol, more typically in the range of from about 3000 to about 6000 g/mol. In one embodiment, the low Tg polymer B segment may be formed from a plurality of polymers, such as commercially available polymers, covalently linked together to obtain the desired molecular weight.

In a block copolymer (M) comprising a plurality of blocks of the polymer (B), each of the blocks of polymer (B) may be the same or different. For instance, the molecular weight of each polymer block may be the same or different, or may be defined by a molecular weight range or polydispersity index (PDI). Typically, the polymer blocks (B) present in the block copolymer are defined by a single molecular weight range or polydispersity index (PDI). The chemical identity of the polymer backbone of each polymer (B) may be the same or different, but is preferably the same for each block of polymer (B).

The Block Copolymer (M)

The block copolymer (M) is made by chemically linking the segments of the aromatic polymer (A) and the low Tg polymer (B) using conventional techniques well known in the art. The segments are suitably functionalised as described hereinabove to facilitate reaction between the two segments, for instance using a difunctional or linking reagent that reacts easily and quantitatively with the functional groups in polymers (A) and (B).

Preferably, polymers (A) and (B) may be functionalised with hydroxyl and/or amino groups. In this embodiment, suitable difunctional or linking reagents include diacid dichlorides such as terephthaloyl dichloride and isophthaloyl dichloride, acid anhydrides and carbodiimides. For instance, an amino-functional aromatic polymer (A) may be mixed with a low Tg polymer (B) preferably to form a solution, and the mixture then added to a solution of the difunctional reagent. Alternatively, an hydroxyl-functional low Tg polymer (B) is first reacted with an excess of the difunctional reagent, before an hydroxyl-functional, or preferably amino-functional, aromatic polymer (A) is added. The block copolymer (M) comprising chemically linked segments of polymers (A) and (B) may be isolated from the reaction solution and then dried.

Preferably the block copolymer (M) comprises:

the aromatic polymer (A) in a mass fraction w(A) of from about 5% to about 99%, preferably from about 10% to about 95%, more preferably from about 15% to about 93%, more preferably from about 40% to about 90%, more preferably from about 55% to about 90%, and in one embodiment from about 60 to about 80%;

and correspondingly, (i) the low Tg polymer (B) in a mass fraction w(B) of from about 95% to about 1%, preferably from about 90% to about 5%, more preferably from about 85% to about 7%, more preferably from about 60% to about 10%, more preferably from about 45% to about 10%, and in one embodiment from about 40 to about 20%, wherein w(A) and w(B) are calculated as $$w(A)=m(A)/m(M)$$

$$w(B)=m(B)/m(M)$$

wherein m(A) is the mass of the aromatic polymer A;

m(B) is the mass of the low Tg polymer B; and m(M) is the mass of the block copolymer M.

Within these constraints, it is preferred that w(A)>w(B), or that w(A) is at least 50% and w(B) is less than 50%.

Preferably the number average molar mass $M_n$ of the block copolymer is in the range of from about 3,000 to about 150,000 g/mol, preferably from about 3.000 to about 80,000 g/mol, preferably from about 3,000 to about 40,000 g/mol, more preferably from about 4,000 to about 30,000 g/mol, and more preferably from about 9,000 to about 30,000 g/mol.

The Thermoset Resin Precursor

The present invention is primarily concerned with thermoset epoxy resins derived from one or more epoxy resin precursor(s). The epoxy resin precursor preferably has at least two epoxide groups per molecule, and may be a polyfunctional epoxide having three, four, or more epoxide groups per molecule. The epoxy resin precursor is suitably liquid at ambient temperature. Suitable epoxy resin precursors include the mono- or poly-glycidyl derivative of one or more of the group of compounds consisting of aromatic diamines, aromatic monoprimary amines, aminophenols, polyhydric phenols, polyhydric alcohols, polycarboxylic acids and the like, or a mixture thereof.

Preferred epoxy resin precursors are selected from:

(i) glycidyl ethers of bisphenol A, bisphenol F, dihydroxydiphenyl sulphone, dihydroxybenzophenone, and dihydroxy diphenyl;

(ii) epoxy resins based on Novolacs; and (iii) glycidyl functional reaction products of m- or p-aminophenol, m- or p-phenylene diamine, 2,4-, 2,6- or 3,4-toluylene diamine, 3,3'- or 4,4'-diaminodiphenyl methane, particularly wherein the epoxy resin precursor has at least two epoxide groups per molecule.

Particularly preferred epoxy resin precursors are selected from the diglycidyl ether of bisphenol A (DGEBA); the diglycidyl ether of bisphenol F (DGEBF); O,N,N-triglycidyl-para-aminophenol (TGPAP); O,N,N-triglycidyl-meta-aminophenol (TGMAP); and N,N,N',N'-tetraglycidyldiaminodiphenyl methane (TGDDM). In one embodiment, epoxy resin precursors are selected from DGEBA and DGEBF. In a preferred embodiment, epoxy resin precursors are selected from DGEBF and TGPAP and blends thereof.

The epoxy group to amino hydrogen equivalent ratio is preferably in the range from 1.0 to 2.0. Formulations displaying an excess of epoxy are preferred to the exact stoichiometry.

Commercially available epoxy resin precursors suitable for use in the present invention include N,N,N',N'-tetraglycidyl diamino diphenylmethane (e.g. grades MY 9663, MY 720 or MY 721; Ciba-Geigy); N,N,N',N'-tetraglycidyl-bis(4-aminophenyl)-1,4-diiso-propylbenzene (e.g. EPON 1071; Shell Chemical Co.); N,N,N',N'-tetraglycidyl-bis(4-amino-3,5-dimethylphenyl)-1,4-diisopropylbenzene, (e.g. EPON 1072; Shell Chemical Co.); triglycidyl ethers of p-aminophenol (e.g. MY 0510; Ciba-Geigy); triglycidyl ethers of m-aminophenol (e.g. MY 0610; Ciba-Geigy); diglycidyl ethers of bisphenol A based materials such as 2,2-bis(4,4'-dihydroxy phenyl)propane (e.g. DE R 661 (Dow), or Epikote 828 (Shell)) and Novolac resins preferably of viscosity 8-20 Pa s at 25° C.; glycidyl ethers of phenol Novolac resins (e.g. DEN 431 or DEN 438; Dow); di-cyclopentadiene-based phenolic Novolac (e.g. Tactix 556, Huntsman); diglycidyl 1,2-phthalate (e.g. GLY CEL A-100); diglycidyl derivative of dihydroxy diphenyl methane (Bisphenol F) (e.g. PY 306; Ciba Geigy). Other epoxy resin precursors include cycloaliphatics such as 3',4'-epoxycyclohexyl-3,4-epoxycyclohexane carboxylate (e.g. CY 179; Ciba Geigy), and those in the "Bakelite" range of Union Carbide Corporation.

In one embodiment of the present invention, the thermoset resin system or curable polymer composition comprises a blend of epoxy resin precursors having the same or different functionality (wherein the term "functionality" in this context means the number of functional epoxide groups). The blend of epoxy resin precursors may comprise one or more epoxy resin precursors having two epoxide groups per molecule (hereinafter referred to as precursor(s) P2), and/or one or more epoxy resin precursors having three epoxide groups per molecule (hereinafter referred to as precursor(s) P3), and/or one or more epoxy resin precursors having four epoxide groups per molecule (hereinafter referred to as precursor(s) P4). The blend may also comprise one or more epoxy resin precursors having more than four epoxide groups per molecule (hereinafter referred to as precursor(s) PP). In one embodiment, only P3 precursor(s) may be present. In an alternative embodiment, only P4 precursor(s) may be present. In one embodiment, a blend of epoxy resin precursors comprises:

from about 0 wt % to about 60 wt % of epoxy resin precursor(s) (P2):
from about 0 wt % to about 55 wt % of epoxy resin precursor(s) (P3); and
from about 0 wt % to about 80 wt % of epoxy resin precursor(s) (P4).

In one embodiment, the blend comprises only one epoxy resin precursor of a given functionality, in the proportions noted above.

The Thermoset Resin

The thermoset resin system or curable polymer composition of the invention are thermally curable. The addition of curing agent(s) and/or catalyst(s) is optional, but the use of such may increase the cure rate and/or reduce the cure temperatures, if desired. In a preferred embodiment, one or more curing agent(s) are used, optionally with one or more catalyst(s). In an alternative embodiment, the thermoset resin system or curable polymer composition described herein are thermally cured without the use of curing agents or catalysts.

Preferably, however, the thermoset resin system or curable polymer composition comprises one or more curing agent(s). The curing agent is suitably selected from known curing agents, for example as disclosed in EP-A-0311349, EP-A-0486197, EP-A-0365168 or in U.S. Pat. No. 6,013,730, which are incorporated herein by reference, such as an amino compound having a molecular weight up to 500 per amino group, for example an aromatic amine or a guanidine derivative. An aromatic amine curing agent is preferred, preferably an aromatic amine having at least two amino groups per molecule, and particularly preferably diaminodiphenyl sulphones, for instance where the amino groups are in the meta- or in the para-positions with respect to the sulphone group. Particular examples are 3,3'- and 4-,4'-diaminodiphenylsulphone (DDS); methylenedianiline; bis(4-amino-3,5-dimethylphenyl)-1,4-diisopropylbenzene (available as EPON 1062 from Shell Chemical Co.); bis(4-aminophenyl)-1,4-diisopropylbenzene (available as EPON 1061 from Shell Chemical Co.); 4,4'methylenebis-(2,6-diethyl)-aniline (MDEA; Lonza); 4,4'methylenebis-(3-chloro, 2,6-diethyl)-aniline (MCDEA; Lonza); 4,4'methylenebis-(2,6-diisopropyl)-aniline (M-DIPA; Lonza); 3,5-diethyl toluene-2,4/2,6-diamine (D-ETDA 80; Lonza); 4,4'methylenebis-(2-isopropyl-6-methyl)-aniline (M-MIPA; Lonza); 4-chlorophenyl-N,N-dimethyl-urea (e.g. Monuron); 3,4-dichlorophenyl-N,N-dimethyl-urea (e.g. Diuron™) and dicyanodiamide (Amicure™ CG 1200; Pacific Anchor Chemical). Bisphenol chain extenders, such as bisphenol-S or thiodiphenol, are also useful as curing agents for epoxy resins. Particularly preferred for use in the present invention are 3,3'- and 4-,4'-DDS.

In one embodiment, the thermoset resin system or curable polymer composition comprises one or more catalyst(s) to accelerate the curing reaction. Suitable catalysts are well known in the art and include Lewis acids or bases. Specific examples include compositions comprising boron trifluoride, such as the etherates or amine adducts thereof (for instance the adduct of boron trifluoride and ethylamine), particularly where epoxy resin precursors are used in conjunction with the aforementioned amine curing agents.

The curable polymer composition may comprise a curing agent and catalyst, for instance as disclosed in U.S. Pat. No. 6,265,491, the contents of which are incorporated herein by reference.

The amount of block copolymer (M) is preferably such that the mass fraction w(M), calculated as w(M)=m(M)/m, where m(M) is the mass of the block copolymer present in a toughened thermoset resin composition having the mass m, of from 0.5% to 40%, preferably from 1% to 35%, and more preferably from 2% to 30%.

The curing agent is typically present at about 5-60% by weight of the total combined weight of the thermoset resin precursor(s) plus curing agent in the composition, preferably about 20-50% by weight, typically about 25-40% by weight.

Thus, the present invention provides a process for the preparation of toughened thermoset resin compositions (R) said process comprising the steps of preparation of the block copolymer (M) defined herein, for instance from an amino- or hydroxyl-functional aromatic polymer (A) and a low Tg polymer (B) which has been functionalised (for instance by an acid dichloride) to have at least two groups that react with an hydroxyl or amino group under addition or condensation, as described herein; mixing said block copolymer (M) with one or more uncured thermoset resin precursor(s) (P), and homogenising the mixture thus obtained; and curing the mixture, for instance by dissolving/dispersing in curing agent/catalyst at reduced temperature and then effecting the cure. (The block copolymer (M) and precursor(s) are usually mixed at a relatively high temperature, and the system is then cooled before addition of the curing agent in order to control the reaction.)

Uses of the Curable Polymer Compositions and Toughened Thermoset Resin Compositions The compositions described herein can be used to manufacture cast or moulded structural materials, in prepregs, and also in adhesive materials. The compositions described herein are particularly suitable for fabrication of structures, including load-hearing or impact-resisting structures. The compositions may be used neat, or as composite materials reinforced with fibres or fillers.

Thus, according to a further aspect of the invention there is provided a moulded or cast article either comprising the thermoset resin compositions defined herein or derivable from the curable polymer compositions defined herein.

According to a further aspect of the invention there is provided a composite material comprising, or derivable from, the thermoset resin compositions or curable, polymer compositions described hereinabove, particularly wherein the composite material is, or comprises, a pre-preg.

Moulded products are obtainable from the compositions of the present invention by the general steps of mixing the block copolymer (M) and the uncured thermoset resin precursor (P), adding curing agent and catalyst as required, homogenising the mixture thus obtained, casting the mixture into a mould to obtain a moulded product, and curing the moulded product at an elevated temperature of at least 100° C. to form a cured moulded product.

In a preferred embodiment, particularly for the fabrication of load-bearing or impact-resisting structures, the compositions are composite materials further comprising reinforcing agent(s) such as fibres or fillers.

Fibres can be added short or chopped typically of mean fibre length not more than 2 cm, for example about 6 mm. Alternatively, and preferably, the fibres are continuous and may, for example, be uni-directionally disposed fibres or woven fabric or braided, knitted or non-woven fabrics to form a pre-preg. As used herein, the term "pre-preg" refers to pre-impregnated and non-cured fibre-reinforced composite materials. A pre-preg typically comprises continuous fibres, but combinations of both short and/or chopped fibres and continuous fibres may be utilised. For some applications, the pre-preg fibres can be selected from short and/or chopped uni-directional fibres alone.

Fibres may be sized or unsized. Fibres can be added typically at a concentration of 5 to 35, preferably at least 20%, by weight. For structural applications, it is preferred to use continuous fibre for example glass or carbon, especially at 30 to 70, more especially 50 to 70% by volume.

The fibre can be organic, especially of stiff polymers such as poly paraphenylene terephthalamide, or inorganic. Among inorganic fibres, glass fibres such as "E" or "S" can be used, or alumina, zirconia, silicon carbide, other compound ceramics or metals. A very suitable reinforcing fibre is carbon, especially as graphite. Graphite fibres which have been found to be especially useful in the invention are those supplied by Cytec under the trade designations T650-35, T650-42 and T300; those supplied by Toray under the trade designation T800-HB; and those supplied by Hexcel under the trade designations AS4, AU4, IM 8 and IM 7.

Organic or carbon fibre is preferably unsized or is sized with a material that is compatible with the composition according to the invention, in the sense of being soluble in the liquid precursor composition without adverse reaction or of bonding both to the fibre and to the thermoset/thermoplastic composition described herein. In particular, carbon or graphite fibres that are unsized or are sized with resin precursor or (poly)arylsulphone are preferred. Inorganic fibre preferably is sized with a material that bonds both to the fibre and to the polymer composition: examples are the organo-silane coupling agents applied to glass fibre.

In one embodiment, the block copolymer defined hereinabove is the only toughening agent present in the composition. In an alternative embodiment, the composition may further contain conventional toughening agents including high-Tg engineering thermoplastics (for instance the aromatic polymers (A) defined herein, such as the polyethersulphones), particulate toughening agents, for instance preformed particles such as glass beads, rubber particles and rubber-coated glass beads, filler such as polytetrafluoroethylene, silica, graphite, boron nitride, mica, talc and vermiculite, pigments, nucleating agents, and stabilisers such as phosphates. Liquid rubbers having reactive groups may also be used. The total of such materials and any fibrous reinforcing agent in the composition is typically at least 20% by volume, as a percentage of the total volume of the composition. The percentages of fibres and such other materials are calculated on the total composition after reaction or processing at the hereinbelow defined temperatures. In a further alternative embodiment, the toughening agents present in the composition comprise and preferably consist of the block copolymer defined hereinabove and high-Tg engineering thermoplastics (for instance the aromatic polymers (A) defined herein, such as the polyethersulphones). In a preferred embodiment, the thermoset resin system or curable polymer composition or toughened thermoset resin composition of the present invention comprising or derived from a block copolymer (M) and one or more uncured thermoset resin precursor(s) (P), as defined herein, does not further comprise a rubber (for instance a rubber selected from the group consisting of silicone, butadiene, acrylic and nitrile rubbers) and/or does not further comprise silicone fine particles.

The composites are obtained from a curable polymer composition made by combining the components of the curable polymer compositions described hereinabove with fibrous reinforcing agent and/or other materials. For instance, the manufacture of a pre-preg typically comprises the steps of mixing the modifier (M) and the uncured thermoset resin precursor (P), adding a curing agent and catalyst as required, homogenising the mixture thus obtained, and applying the homogenised mixture to a bundle or strand of parallel aligned fibres or fibre weaves or braided or knitted or non-woven fabrics to form the pre-preg. A solvent may be present to aid processing. The solvent and the proportion thereof are chosen so that the mixture of the components forms at least a stable emulsion, preferably a stable apparently single-phase solution. Typically a mixture of solvents is used, for example of a halogenated hydrocarbon and an alcohol, in a ratio suitably in the range 99:1 to 85:15. Conveniently the solvents in such a mixture should boil at under 100° C. at 1 atm pressure and should be mutually miscible in the proportions used. Alternatively the components can be brought together by hot melting and/or high shear. The mixture is stirred until sufficiently homogeneous. Thereafter any solvent is removed by evaporation. Evaporation is suitably at 50-200° C. and, at least in its final stages, can be at sub-atmospheric pressure, for example in the range 13.33 Pa to 1333 Pa (0.1 to 10 mm Hg). The composition preferably contains up to 5% w/w of volatile solvent; to assist flow when used to impregnate fibres. This residual solvent will be removed in contact with the hot rollers of the impregnating machine.

More specifically, fabrication of articles and composites from the compositions of the present invention is as follows. The composition in the form of a resin solution is transferred onto a suitable mould or tool for preparation of a panel, prepreg or the like, the mould or tool having been preheated to a desired degassing temperature. The stable emulsion is combined with any reinforcing, toughening, filling, nucleating materials or agents or the like, and the temperature is raised to initiate curing thereof. Suitably curing is carried out at elevated temperature up to 200° C., preferably in the range of 160 to 200° C., more preferably at about 170-190° C., and with use of elevated pressure to restrain deforming effects of escaping gases, or to restrain void formation, suitably at pressure of up to 10 bar, preferably in the range of 3 to 7 bar abs. Suitably the cure temperature is attained by heating at up to 5° C./min. for example 2° C. to 3° C./min and is maintained for the required period of up to 9 hours, preferably up to 6 hours, for example 3 to 4 hours. The use of a catalyst may allow even lower cure temperatures. Pressure is released throughout and temperature reduced by cooling at up to 5° C./min. for example up to 3° C./min. Post-curing at temperatures in the range of 190° C. to 200° C. may be performed, at atmospheric pressure, employing suitable heating rates to improve the glass transition temperature of the product or otherwise. The mould or tool may be constructed of any suitable material, for instance an unsaturated polyester or thermoset resin such as epoxy or bis-maleimides having a heat resistance in excess of the forming temperature to be employed. Reinforcement is suitably provided in the form of glass fibres. Composite moulds may be prepared in a conventional manner.

The composition, possibly containing some volatile solvent already present or newly added, can be used for example as an adhesive or for coating surfaces or for making solid structures by casting possibly in a foamed state. Short fibre reinforcement may be incorporated with composition prior to curing thereof. Preferably a fibre-reinforced composition is made by passing essentially continuous fibre into contact with such resin composition. The resulting impregnated fibrous reinforcing agent may be used alone or together with other materials, for example a further quantity of the same or a different polymer or resin precursor or mixture, to form a shaped article. This technique is described in more detail in EP-A-56703, 102158 and 102159.

A further procedure comprises forming incompletely cured composition into film by, for example, compression moulding, extrusion, melt-casting or belt-casting, laminating such films to fibrous reinforcing agent in the form of, for example, a non-woven mat of relatively short fibres, a woven cloth or essentially continuous fibre in conditions of temperature and pressure sufficient to cause the mixture to flow and impregnate the fibres and curing the resulting laminate.

Plies of impregnated fibrous reinforcing agent, especially as made by the procedure of one or more of EP-A 56703, 102158, 102159, can be laminated together by heat and pressure, for example by autoclave, vacuum or compression moulding or by heated rollers, at a temperature above the curing temperature of the thermosetting resin or, if curing has already taken place, above the glass transition temperature of the mixture, conveniently at least 180° C. and typically up to 200° C., and at a pressure in particular in excess of 1 bar, preferably in the range of 1-10 bar.

The resulting multi-ply laminate may be anisotropic in which the fibres are continuous and unidirectional, orientated essentially parallel to one another, or quasi-isotropic in each ply of which the fibres are orientated at an angle, conveniently 45° as in most quasi-isotropic laminates but possibly for example 30° or 60° or 90° or intermediately, to those in the plies above and below. Orientations intermediate between an isotropic and quasi-isotropic, and combination laminates, may be used. Suitable laminates contain at least 4 preferably at least 8, plies. The number of plies is dependent on the application for the laminate, for example the strength required, and laminates containing 32 or even more, for example several hundred, plies may be desirable. There may be aggregates, as mentioned above in interlaminar regions. Woven fabrics are an example of quasi-isotropic or intermediate between anisotropic and quasi-isotropic.

The curable polymer composition is suitably adapted to be cured at a temperature less than that at which the material constituting the mould or tool on or in which it is intended to cure the resin composition becomes heat-sensitive in any way.

According to a further aspect of the invention, there is provided a method for the manufacture of a thermoset resin composition comprising disposing the curable polymer composition in a suitable mould or tool, or equivalent state in which it is to be formed, subjecting the composition to the desired elevated temperature at suitable pressure, for example at atmospheric pressure, and maintaining the temperature for a required period, as hereinbefore defined.

According to a further aspect of the invention, there is provided a composite comprising pre-pregs laminated together by heat and pressure, for example by autoclave, compression moulding, or by heated rollers, at a temperature above the curing temperature of the polymer composition.

The present invention is applicable to the manufacture of composites by conventional prepreg technology and also by resin infusion technology (as described for instance in US-2004/0041128). Resin infusion is a generic term which covers processing techniques such as Resin Transfer Molding (RTM), Liquid Resin Infusion (LRI), Vacuum Assisted Resin Transfer Molding (VARTM), Resin Infusion with Flexible Tooling (RIFT), Vacuum Assisted Resin Infusion (VARI), Resin Film Infusion (RFI). Controlled Atmospheric Pressure Resin Infusion (CAPRI), VAP (Vacuum Assisted Process) and Single Line Injection (SLI). The composites described herein particularly include composites formed through the use of resin-soluble thermoplastic veils in a resin infusion process as described in US-2006/0252334, the disclosure of which is incorporated herein by reference. In one embodiment, the composite is manufactured through resin infusion wherein a support structure comprising structural reinforcement fibers (dry) and the resin-soluble thermoplastic veil element is placed into a bag, mold or tool to provide a perform, a curable resin matrix composition is injected/infused directly into the combined structural reinforcement fibers and veil, and then cured.

According to a further aspect of the invention, there is provided a thermoplast, or a thermoplast-modified, thermoset resin shaped product comprising or derived from a composition, pre-preg or composite as hereinbefore defined, particularly one which is obtained by a method as hereinbefore defined.

The compositions of the present invention finds particular utility in the manufacture of components suitable for use in transport applications (including aerospace, aeronautical, nautical and land vehicles, and including the automotive, rail and coach industries), in building/construction applications or in other commercial applications.

The toughened thermoset resin compositions according to the present invention can also be used for making adhesive joints comprising applying an homogenised mixture (comprising the block copolymer (M) and uncured thermoset resin precursor (P), with curing agent and catalyst as required) as a coating to flat or structured surfaces of at least two bodies, and pressing the coated surfaces of said bodies against each other under heating said bodies to a temperature of at least 50° C. to form an adhesive joint between the said surfaces of the said bodies.

According to a further aspect of the present invention, there is provided the use of the thermoplastic aromatic polymer (A) having a Tg of at least about 150° C. as defined herein as a compatibiliser for the low Tg polymer (B) defined herein in a thermoset resin (R), for instance in thermoset resins where the insolubility of the polymer (B) in the thermoset resin otherwise renders the polymer (B) unusable or inaccessible as a toughening agent, wherein:
  (i) said thermoplastic aromatic polymer block (A) and said low Tg polymer (B) are in the form of a block copolymer (M) having at least one block derived from said thermoplastic aromatic polymer (A), and at least one block derived from said low Tg polymer (B);
  (ii) said block copolymer (M) is a toughening agent for said thermoset resin (R),
  (iii) the low Tg polymer (B) exhibits a Tg in the range of from about −130° C. to about +40° C.:
  (iv) the aromatic polymer (A) is soluble in the uncured thermoset resin precursor(s) (P) of said thermoset resin (R),
  (v) the low Tg polymer (B) is insoluble in the uncured thermoset resin precursor (P).

According to a further aspect of the present invention, there is provided a method of compatibilising a low Tg polymer (B) in a thermoset resin (R), for instance in thermoset resins where the insolubility of the low Tg polymer (B) in the thermoset resin otherwise renders the polymer (B) unusable or inaccessible as a toughening agent, said method comprising combining said low Tg polymer (B) with a thermoplastic aromatic polymer block (A) having a Tg of at least about 150° C. in the form of a block copolymer (M) having at least one block derived from said thermoplastic aromatic polymer (A), and at least one block derived from said low Tg polymer (B), wherein:
  (i) said block copolymer (M) is a toughening agent for said thermoset resin (R).
  (ii) the low Tg polymer (B) exhibits a Tg in the range of from about −130° C. to about +40° C.;
  (iii) the aromatic polymer (A) is soluble in the uncured thermoset resin precursor(s) (P) of said thermoset resin (R),
  (iv) the low Tg polymer (B) is insoluble in the uncured thermoset resin precursor (P).

The block copolymers of the present invention may also be used to prepare engineered cross-linked thermoplastic particles for interlaminar toughening of pre-pregs and composite materials, as disclosed in WO-2010/136772-A, the disclosure of which is incorporated herein by reference, and in particular the disclosure of the preparation of such particles from the thermoplastic polymer (which, herein, is replaced by the block copolymer of the present invention); and the disclosure of resin systems and prepregs, composites and fibre preforms made therefrom. The interlaminar region is the portion of a composite material that comprises the resin-rich region of a composite between layers of fibres (such as carbon fibre). In preparation of such particles, the block copolymer of the present invention is typically (and preferably is) used in association with one or more cross-linking agents as disclosed in WO-2010/136772-A. The cross-linking affects the dissolution of the particles in the thermosetting resin (typically an epoxy resin as described herein) and the diffusion of the uncured thermosetting resin into the particles. Thus, in a further aspect, the present invention provides an engineered cross-linked thermoplastic particle having a thermoplastic polymer backbone selected from the block copolymers described herein, and a cross-linking agent cross-linked to said thermoplastic polymer backbone, wherein the cross-linking agent has a reactivity of at least two, wherein the cross-linking agent is reactive with the reactive pendant groups of said thermoplastic polymer backbone, wherein the thermoplastic backbone is chemically cross-linkable, wherein the engineered cross-linked thermoplastic particle is substantially insoluble in the thermosetting resin upon curing, wherein the engineered cross-linked thermoplastic particle is capable of swelling upon curing, and wherein the thermosetting resin is capable of diffusing into the engineered cross-linked thermoplastic particle. The particles typically have a particle size of from about 1 to about 100 μm before curing.

The invention is now illustrated in non-limiting manner with reference to the following examples.

EXAMPLES

The following materials were used to prepare the block copolymers:

E1: saturated polyester diol made from dimerised fatty acids, number average molar mass 3000 g/mol, hydroxyl number ("OHN") according DIN EN ISO 4629 of (37.1±2.8) mg/g, equivalent to a specific amount of substance of hydroxyl groups in the polyester diol of (0.66±0.05) mol/kg, (®Priplast 3196, Croda International Plc.)

E2: saturated polyester polyol made from dimerised fatty acids, number average molar mass 2000 g/mol, OHN=(55±5) mg/g, equivalent to a specific amount of substance of hydroxyl groups in the polyester polyol of (0.98±0.09) mol/kg (®Priplast 3199, Croda International Plc.)

Polyether sulphones "PES", prepared as described in EP-0311349-A, example 1.

"Mixed solvent" is a dry, water-free mixture of dichloromethane and chloroform, in a volume ratio of 2:1.

"Acidified methanol" is a mixture of 1 mL of glacial acetic acid with 1 L of methanol.

Example 1

PES Segments

Amine-terminated polyethersulphones were prepared according to the procedure disclosed in EP-0311349-A by reacting 4,4'-dichlorodiphenylsulphone (DCDPS) with hydroquinone (HQ), 4,4'-dihydroxy-diphenylsulphone (bisphenol S, "BisS") and meta-aminophenol (MAP) in the presence of potassium carbonate in diphenyl sulphone or sulfolane as solvent at a temperature rising to 280° C. MAP is used to functionalise PES polymer chains.

A ratio of the amount of substance n(HQ) of hydroquinone to the amount of substance n(BisS) of n(HQ)/n(BisS)=1.5 mol/mol was used. The amounts of educts, or starting products, was adjusted to achieve a calculated number average molar mass $M_n$ ranging from 3100 g/mol to 9500 g/mol. $M_n$ and amine functionality $f(N)$ (average number of aminic nitrogen atoms per polymer chain) of the PES polymers are summarised in Table 1. For all four PES polymers, the molar ratio of PES:PEES (I:II) units, as defined hereinabove, is 40:60.

TABLE 1

Description of Polyethersulphones

| PES polymers | $M_n$ | f(N) |
|---|---|---|
| PES-1 | 3100 g/mol | 1.80 |
| PES-2 | 7400 g/mol | 1.82 |
| PES-3 | 8600 g/mol | 1.90 |
| PES-4 | 9500 g/mol | 1.70 |

A series of block copolymers was then synthesised by coupling the PES and polyester polyol building blocks by means of a diacid chloride compound in an inert atmosphere, as described below.

Example 2

Synthesis of Block Copolymer (Modifier) M1

The block copolymer M1 was synthesised from polyester polyol E2 and the polyether sulphone PES-1 according to the following procedure.

3.28 g of terephthaloyl chloride (16 mmol) were dissolved in 330 mL of mixed solvent. The solution was cooled by means of a bath of dry ice.

16.00 g of E2 (8 mmol) were diluted with 165 mL of mixed solvent and 6.5 mL of anhydrous pyridine. This solution was added to the cold acid chloride solution. The mixture was stirred further for 5 minutes. The bath of dry ice was then removed, and the reaction mixture was allowed to reach room temperature and was vigorously stirred for a-further 24 hours.

49.60 g of dry PES 1 (16 mmol) were dissolved in 330 mL of mixed solvent and 6.5 mL of anhydrous pyridine. The PES solution was added to the solution of acyl chloride functionalised polyester polyol. The reaction solution was stirred at room temperature for a further 48 hours. The product of reaction was precipitated by pouring the solution of reaction into 1 L of acidified methanol. After filtration, the precipitated polymer was washed four times with 3 L each of cold water, rinsed with 200 mL of methanol and dried under vacuum at 70° C. overnight.

Characteristics of M1 are summarised in Table 2. Mass fraction of E segments w(E) in the polymer is calculated by dividing the mass m(E) of segments E by the mass m of the polymer containing this segment.

Example 3

Synthesis of Block Copolymers (Modifiers) M2, M3 and M4

Each solution involved in this procedure was prepared with mixed solvent. The block copolymers M2, M3 and M4 were synthesised according to the following procedure.

3.28 g of terephtaloyl chloride (16 mmol) were dissolved in 330 mL of mixed solvent. The solution was cooled by means of a bath of dry ice.

24.00 g of E1 (8 mmol) were dissolved in 165 mL of mixed solvent and 6.5 mL of anhydrous pyridine. This basic polyester polyol solution was added to the cold acid chloride solution. The mixture was stirred further for 5 minutes. The bath of dry ice was then removed. The reaction mixture was allowed to reach room temperature (20° C.) and was vigorously stirred for a further 24 hours.

Dried PES (16 mmol, equivalent to 49.60 g for PES-1, 118.40 g for PES-2 and 152.00 g for PES-4) was dissolved in 330 mL of mixed solvent and 6.5 mL of anhydrous pyridine. In separate runs, these PES solutions were added each to a solution of acyl chloride functionalised polyester polyol. The reaction solution was stirred at room temperature (20° C.) for a further 48 hours.

The product of reaction was precipitated by pouring the solution of reaction into 1 L of acidified methanol. After filtration, the precipitated polymer was washed 4 times in 3 L of water, rinsed with 200 mL of methanol and dried under vacuum at 70° C. overnight.

Following this procedure, three types of block copolymers were synthesised from the polyester polyol E1 as described in Table 2.

Example 4

Synthesis of Block Copolymers (Modifiers) M5 and M6

The block copolymers M5 and M6 were synthesised from chain-extended polyester polyol E1, according to the following procedure.

3.59 g of terephthaloyl chloride (18 mmol) were dissolved in dichloromethane/chloroform (350 mL). The solution was cooled by means of a bath of dry ice.

35.00 g of E1 (12 mmol) were dissolved in 240 mL of mixed solvent and 9.6 mL of anhydrous pyridine.

The basic polyester polyol solution was added to the cold acid chloride solution. The mixture was stirred further for 5 minutes. The bath of dry ice was then removed. The reaction mixture was allowed to reach room temperature. (20° C.) and was vigorously stirred for a further 24 hours.

86.33 g of dry PES-2, and in another run, 100.33 g of PES-3 (12 mmol) were dissolved each in 230 mL of mixed solvent and 4.8 mL of anhydrous pyridine. The PES solution was added to the solution of acyl chloride functionalised polyester polyol. The reaction solution was stirred at room temperature for a further 48 hours.

The product of reaction was precipitated by pouring the solution of reaction into 1 L of acidified methanol. After filtration, the precipitated polymer was washed 4 times with 3 L each of water, and finally rinsed with 200 mL of methanol and dried under vacuum at 70° C. overnight. Characteristics of M5 and M6 are summarised in Table 2.

Example 5

Synthesis of Block Copolymers (Modifier) M7

The block copolymer M7 was synthesised from chain-extended polyester polyol E1 and PES-3, according to the following procedure.

3.189 g of terephthaloyl chloride (16 mmol) were dissolved in 315 mL of mixed solvent. The solution was cooled by means of a bath of dry ice.

35.00 g of E1 (12 mmol) were dissolved in 240 mL of mixed solvent and 9.6 mL of anhydrous pyridine.

The basic polyester polyol solution was added to the cold acid chloride solution. The mixture was stirred further for 5 minutes. The bath of dry ice was then removed. The reaction mixture was allowed to reach room temperature (20° C.) and was vigorously stirred for a further 24 hours.

66.89 g of dry PES-3 (8 mmol) were dissolved in 150 mL of mixed solvent and 3.2 mL of anhydrous pyridine. This PES solution was added to the solution of acyl chloride functionalised polyester polyol.

The reaction solution was stirred at room temperature for a further 48 hours. The product of reaction was precipitated by pouring the solution of reaction into 1 L of acidified methanol. After filtration, the precipitated polymer was washed 4 times with 3 L each of water, and then rinsed with 200 mL of methanol and dried vacuum at 70° C. overnight. Characteristics of M7 are summarised in Table 2.

TABLE 2

Description of Modifiers M1 to M7

| Block copolymer | PES segments | E segment | mass fraction of E segments w(E) |
|---|---|---|---|
| M1 | PES-1 | E2 | 0.24 |
| M2 | PES-1 | E1 | 0.33 |
| M3 | PES-2 | E1 | 0.17 |
| M4 | PES-4 | E1 | 0.14 |
| M5 | PES-2 | E1 | 0.29 |
| M6 | PES-3 | E1 | 0.26 |
| M7 | PES-3 | E1 | 0.34 |

Example 6

Synthesis of High Molar Mass PES Toughening Agent (Modifier) M8

A chain-extended PES polymer, M8, was synthesised by reaction of two molecules of PES-2 with one molecule of acid chloride. Modifier M8 is included herein as a comparative example.

0.69 g of terephthaloyl chloride (3.5 mmol) were dissolved in 80 mL of dry dichloromethane. 50.00 g of PES 2 (7 mmol) were dissolved in 175 mL of dichloromethane and 0.5 mL of anhydrous pyridine.

The basic polyether sulphone solution was poured into the acid chloride solution. The mixture was stirred at room temperature for a further 48 hours.

The product of reaction was precipitated by pouring the solution of reaction into 1 L of acidified methanol. After filtration, the precipitated polymer was washed 4 times with 3 L each of water, then rinsed with 200 mL of methanol, and dried under vacuum at 70° C. overnight. The number average molar mass of M8 was determined using $^1$H-NMR as 15000 g/mol.

Comparative Examples C1 to C3

A series of resins prepared with commercially available block copolymers were used as comparative examples, as follows.

(Comparative toughening agent C1 was Fortegra® 100, polyether block copolymer available from Dow Chemicals, which is understood to comprise the soluble poly(oxyethylene) segment as disclosed in the patent application US2009/123759.

(Comparative toughening agent C2 was Nanostrength® AFX E20 (Arkema, France), which is understood to be an SBM block copolymer (polystyrene/polybutadiene/polymethyl methacrylate) according to example 1 of WO-2006/077153, and as disclosed in EP-0524054 and EP-0749987.

Comparative toughening agent C3 was Nanostrength® M22 (Arkema, France), which is understood to be a MAM block copolymer (polymethyl methacrylate/polybutyl acrylate/polymethyl methacrylate) according to example 3 of WO-2006/077153.

Example 7

Preparation of Toughened Thermoset Resin Composition

The following procedures characterise the examples.
Tack

In the present invention, the level of tack of the carbon fibre prepregs was measured semi-quantitatively by experienced operators. After being laid up, two plies of prepregs are pulled apart. The resistance encountered to pull apart the two plies is directly correlated to the tack of the prepregs and scored as follows:

Zero: The two plies do not stick to each other. The prepreg is described as dry.
Low: The two plies are slightly sticky. A light pressure has to be applied to ensure that the plies stick to each other.
Medium: The two plies are sticky. They can be easily laid up and pulled apart.
High: The two plies are very sticky. They bond strongly to each other.

Alternatively, tack may be evaluated on a commercial universal testing machine. Pre-preg sheets are pressure-bonded together and the force required for separating them is measured.
Sample: (50×50) mm$^2$
Loading speed: 1 mm/min
Load for adhesion: 0.12 MPa
Loading time: (5±2) s
Peeling speed: 10 mm/min Tackiness may then be expressed on a scale from 10 to 1; 10 being the maximum peeling force recorded for the neat thermoset resin system for each of the resin/curing agent compositions, and 1 being 10% or less of the said maximum peeling force.

Improved tack properties are beneficial in the preparation of composites, and provide advantages in the processability and handling of the composite.
Mechanical Properties On neat resins, fracture toughness (measured in terms $K_{1C}$ and $G_{1C}$) and modulus of elasticity (E-modulus), were measured on compact tension (CT) specimens, used in opening mode 1 test according to the method ISO 13586.

The E-modulus was calculated following the method proposed by Saxena and Hudak (International Journal of Fracture, 1978, vol. 14, p. 453 et seq.). A notch was machined into the specimen, and a sharp pre-crack was generated by tapping a razor blade at the notch. The initial pre-crack length was estimated from the visible crack appearance at both sides of the specimen. Tests were carried out using a universal testing machine model Zwick Z 2.5 kN under controlled atmosphere conditions (23° C. and 50% relative humidity) and a crosshead speed of 10 mm/min. A minimum of four specimens of each epoxy formulation were tested.

On carbon fibre laminates, $G_{1C}$ was measured according to Boeing Standard BSS 7273 (19 Jan. 1994).
Glass Transition Temperature Glass transition temperatures were measured by Dynamic Mechanical Thermal Analysis on cured resins using an Ares LS 2K/2K FRT apparatus. Rectangular bars (1.4×4.0×45) mm$^3$ were subjected to a temperature sweep from 30° C. to 300° C. at a 3 K/min heating ramp, a frequency of 0.1 Hz and a strain of 0.1%. The temperatures at the maxima of tan δ versus temperature curves are reported as glass transition temperatures.

Morphology

Morphology of the toughened resin compositions was determined using optical microscopy (OM), scanning electron microscopy (SEM) or transmission electron microscopy (TEM) and the results of these analyses are presented in the tables below. Specimen cross sections were polished prior to optical microscopy analysis in reflection and SEM investigation. Prior to SEM analysis, the polished specimens were treated with a super acid solution composed of sulphuric acid, phosphoric acid and distilled water to reveal the morphology. A volume ratio of 10 mL to 4 mL to 1 mL was used. The super acid solution, activated with 0.1 g of potassium permanganate for 10 mL, etched preferentially the secondary phase developed in the resin systems (i.e. modifier-rich region). A treatment with this etching solution for twenty minutes led to reproducible results. The specimens were then coated with a platinum film by means of a Polaron SC7640 diode sputter coater and examined by means of a Hitachi S4500 Field Emission SEM and an associated PCI digital image acquisition system.

Figure 2:
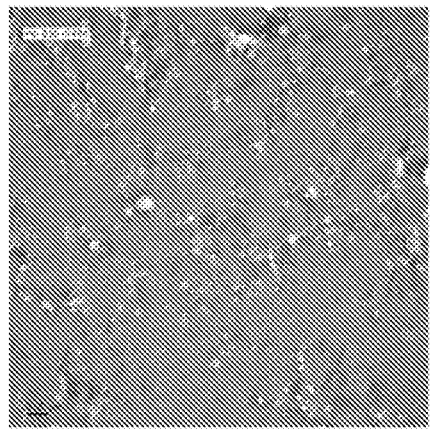
Figure 3:
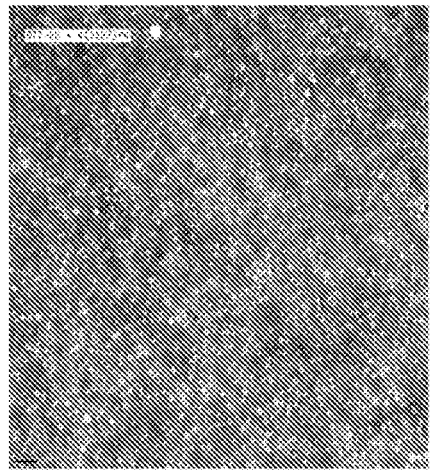

Morphology of the toughened resin systems investigated with transmission electron microscopy (TEM) is illustrated by the micrographs in FIGS. 1 to 3. Ultrathin sections (about 50 nm thickness) of materials were prepared using a Reichert Ultracut E ultramicrotome. The TEM apparatus was a Philips CM12 TEM and an associated Gatan digital camera system.

Observed morphologies analysed were classified either as homogeneous or as phase-separated. Where phase-separated, the morphology was classified as:
(i) macro-phase separation: the heterogeneity of the resin system is observable by eye. The resin is heterogeneous at the macro-scale.
(ii) coarse morphology: the resin is homogenous at the macro-scale, but a closer investigation by OM or SEM displays heterogeneity at the micron-scale.
(iii) sub-micronic morphology: the resin is homogeneous at the macro-scale. A close investigation by SEM or TEM displays a secondary phase of dimension greater than 100 nm and up to 1 μm.
(iv) nano-structure: the resin is homogeneous at the macro-scale. A close investigation by SEM or TEM displays a secondary phase with at least one dimension not bigger than 100 nm. The most preferred morphology.

Sub-micronic and nano-structure morphologies were classified depending on their structure as either:
(a) co-continuous: to describe a secondary phase forming with the thermoset matrix two fully intricate continuous phases (i.e. infinite clusters). The system could also be described as interpenetrated polymer networks (IPN).
(b) semi-continuous: to describe a secondary phase forming an interrupted continuous network (i.e. finite clusters) within a continuous thermoset matrix. The system could also be described as semi-interpenetrated polymer networks (semi-IPN).
(c) particulate: to describe a morphology in which the secondary phase is distributed into particles. The particles may be dispersed or aggregated forming a continuous network. A particulate morphology may also be described as an "islands-in-the-sea" structure where the sea corresponds to the continuous resin matrix and the islands to the particles.

Co-continuous morphologies tend to exhibit higher fracture toughness relative to particulate morphologies. However, the particulate nano-structure morphologies of the resin systems of the present invention are particularly attractive when solvent resistance is an important requirement for the resin. Thus, particulate nano-structure morphology in the resin systems of the present invention significantly enhances the fracture toughness, albeit less so than co-continuous nano-morphology, and provides a particularly advantageous combination of high fracture toughness and good solvent resistance.

The cured thermoset resin compositions of the present invention preferably exhibit a dispersed secondary phase of no more than 100 nm, and preferably exhibit particulate nano-structure.

Viscosity

The evolution of the resin viscosity as a function of the temperature was analysed from 70° C. to the gel point, which is defined as the temperature reached experimentally when storage and loss modulus are equal (or in other words, for tan delta equal to 1).

Experiments were run on an Ares LS 2K/2K FRT viscosimeter apparatus in parallel plate mode and Dynamic Temperature Ramp Test method, complying with the following experimental conditions: 1 Hz frequency, 20% strain and 1 K/min heating ramp.

Solvent Resistance

Solvent resistance was assessed using methyl ethyl ketone (MEK: chromasolv grade (Aldrich)). Rectangular bars of cured materials (of dimensions 45×4×1.4 mm) were dried at 70° C. under vacuum for 48 h before weighing (t=0) and immersion in boiling MEK. The experiments were run in 500 mL three-necked round-bottom flasks, equipped with a condenser and two glass stoppers. Thermo-stated oil baths (T=120° C.) brought the MEK to reflux (bp=80° C.). For each material, at least 4 specimens were exposed to approximately aggressive treatment for about 7-8 hours per day for a total of about 40-49 hours. The systems were allowed to cool down overnight. The solvent uptake of each specimen was measured before any new exposure. The standard deviation on the weight measurement is about <0.1%. For each exposure time, the solvent uptake which equals $(W-W_d)/W_d*100$ was calculated. W corresponds to the mass of the specimen at a time t and $W_d$ to the mass of the dry specimen (t=0).

Materials

The following epoxy resins were used in the tests:
®Araldite PY306, a diglycidylether of bisphenol F (DGEBF) with a specific content of epoxide groups of from 5.99 mol/kg to 6.41 mol/kg (an "epoxy equivalent weight" of from 156 g/mol to 167 g/mol) from Huntsman Advanced Materials,
®Araldite MY0510, a O,N,N-triglycidyl para-aminophenol (TGPAP) with a specific content of epoxide groups of from 9.35 mol/kg to 10.53 mol/kg (an "epoxy equivalent weight" of from 95 g/mol to 107 g/mol) from Huntsman Advanced Materials,
®Araldite MY721, a N,N,N',N'-tetraglycidyl diaminodiphenylmethane (TGDDM) with a specific content of epoxide groups of from 8.70 mol/kg to 9.17 mol/kg, (an "epoxy equivalent weight" of from 109 g/mol to 115 g/mol) from Huntsman Advanced Materials.

The curing agents were diamino diphenyl sulphones (DDS), utilised as two different isomers:
®Aradur 9664-1, a 4,4'-diamino diphenyl sulphone (Huntsman Advanced Materials),
®Aradur 9719-1, a 3,3'-diamino diphenyl sulphone (Huntsman Advanced Materials).

The catalyst was a boron trifluoride ethylamine complex ($BF_3$.MEA; Aldrich; melting point of 85-89° C.).

These materials are generally referred to hereinafter by their commercial grade designation for brevity. Compositions of the mixtures prepared are listed along with the test results in the tables below.

Example 7.1

Low Temperature Curing Systems for Neat Resin Preparation

The masses of the various components used in the examples are shown in Table 3:

TABLE 3

|  | mass fraction of toughening agent | | |
|---|---|---|---|
|  | 20% | 10% | 5% |
| PY 306 | 29.30 g | 32.96 g | 34.79 g |
| MY 0510 | 28.16 g | 31.68 g | 33.43 g |
| toughening agent | 20.00 g | 10.00 g | 5.00 g |
| 3,3'-DDS | 22.02 g | 24.78 g | 26.16 g |
| BF$_3$•MEA | 0.52 g | 0.58 g | 0.62 g |
| Acetone | 1.0 mL | 1.0 mL | 1.0 mL |

PY 306 and MY 0510 were mixed at 70° C. for 30 minutes. The toughening agent was added to the epoxide mixture and stirred in. The temperature was raised to 120° C. to allow the toughening agent to fully dissolve after one hour of mixing. The blend was then cooled down to 90° C. before adding the curing agent, 3,3'-DDS. The curing agent was dissolved under constant mixing at 90° C. for 30 minutes. The blend was cooled further down to 75° C. An acetone solution of BF$_3$.MEA was then added to the blend, and mixed for a further 20 minutes. The formulated resins were cast into a mould and degassed at 75° C. for 3 hours and finally cured at 120° C. for 3 further hours, and post-cured at 180° C. for 2 hours. The characterising data are presented in Table 4.1 below.

the epoxy resin precursor and brings micro-structuration to the low temperature epoxy resin.

In example 7.1-5, a mass fraction of 5 wt % of modifier M3 leads to the formation of nano-particulate resin with a fracture toughness of 0.83±0.05 MPa m$^{0.5}$ and a glass transition temperature of 173° C., compared to Example 7.1-1, with a mass fraction of 10% of PES-2 which leads to a homogeneous blend with a fracture toughness of 0.79±0.03 MPa m$^{0.5}$ and a glass transition temperature of 161° C.

In Example 7.1-7, a mass fraction of 20% of M5 in the modified epoxy resin leads to nano-scale morphology and a K$_{1C}$ increase of 35% compared to Example 7.1-3, which has a mass fraction of 20% of M8 in the modified epoxy resin and which exhibits only sub-micron morphology.

Example 7.2

High Temperature Curing Systems for Neat Resin Preparation

The masses of the various components used in the samples are shown in the table below:

|  | mass fraction of toughening agent | | | | |
|---|---|---|---|---|---|
|  | 30% | 20% | 10% | 2% | 0% |
| PY 306 | 25.80 g | 29.50 g | 33.20 g | 36.10 g | 36.86 g |
| MY 0510 | 24.80 g | 28.30 g | 31.90 g | 34.70 g | 35.43 g |
| toughening agent | 30.00 g | 20.00 g | 10.00 g | 2.00 g | 0.00 g |
| 4,4'-DDS | 19.40 | 22.20 g | 24.90 g | 27.20 g | 27.71 g |

PY 306 and MY0510 were mixed at 70° C. for 30 minutes. The toughening went was then added to the epoxide mixture and stirred in. The temperature was raised to 120° C. to allow the toughening agent to fully dissolve after 1 hour of mixing. 4,4'-DDS was then added to the blend and dissolved under constant vigorous mixing at 120° C. for 30 minutes. The

TABLE 4.1

Performances of Low Temperature Cure Resin Systems

| Ex. | Modifier | mass fraction (%) | K$_{IC}$ (MPa·m$^{0.5}$) | G$_{IC}$ (J·m$^{-2}$) | T$_g$ (° C.) | morphology |
|---|---|---|---|---|---|---|
| 7.1 - 1 | PES-2 | 10 | 0.79 ± 0.03 | 188 ± 16 | 161 | Homogeneous - TEM |
| 7.1 - 2 | PES-2 | 20 | 0.90 ± 0.03 | 246 ± 37 | 168 | Co-continuous (nm) - TEM |
| 7.1 - 3 | M8 | 20 | 1.29 ± 0.04 | 504 ± 28 | 173 | Semi-continuous (sub-micron) - TEM |
| 7.1 - 4 | M1 | 20 | 1.30 ± 0.02 | 509 ± 20 | 179 | Particulate dispersion (sub-micron) - TEM |
| 7.1 - 5 | M3 | 5 | 0.83 ± 0.05 | 208 ± 24 | — | Particulate dispersion (nm) - SEM |
| 7.1 - 6 | M3 | 20 | 1.54 ± 0.08 | 723 ± 79 | 173 | Semi-continuous (nm) - TEM |
| 7.1 - 7 | M5 | 20 | 1.74 ± 0.08 | 922 ± 80 | 176 | Semi-continuous (nm) - TEM |

Thus, PES-2 is soluble in the low temperature cure epoxy resin precursors, forming, after cure, either a homogenous phase or a co-continuous secondary phase at the nano-scale. M8 (the high molecular weight version of PES-2) is soluble in formulated resins were cast into a mould and degassed at 85° C. for 2 hours to three hours before curing at 180° C. for 3 hours. The characterising data are presented in Table 4.2 below.

TABLE 4.2

Performances of High Temperature Cure Resin Systems

| Ex. | Modifier | mass fraction (%) | K$_{IC}$ (MPa·m$^{0.5}$) | G$_{IC}$ (J·m$^{-2}$) | T$_g$ (° C.) | morphology |
|---|---|---|---|---|---|---|
| 7.2-1 | none | 0 | 0.52 | 70 | 206 | Homogeneous |
| 7.2-2 | PES-2 | 20 | 0.73 ± 0.08 | 162 ± 36 | 198 | Homogeneous |

TABLE 4.2-continued

Performances of High Temperature Cure Resin Systems

| Ex. | Modifier | mass fraction (%) | $K_{IC}$ (MPa·m$^{0.5}$) | $G_{IC}$ (J·m$^{-2}$) | $T_g$ (°C.) | morphology |
|---|---|---|---|---|---|---|
| 7.2-3 | PES-3 | 30 | 0.84 ± 0.02 | 200 | 192 | Homogeneous |
| 7.2-4 | M8 | 20 | 0.82 ± 0.03 | 202 ± 14 | 197 (180) | Co-continuous (nm); TEM |
| 7.2-5 | C1 | 2 | — | — | — | Macro-phase separation; OM |
| 7.2-6 | C2 | 10 | — | — | — | Coarse morphology; OM |
| 7.2-7 | C3 | 10 | — | — | — | Coarse morphology; OM |
| 7.2-8 | M2 | 20 | 0.97 ± 0.05 | 288 ± 17 | 210 | Particles - dispersed (nm); TEM |
| 7.2-9 | M1 | 20 | 1.04 ± 0.04 | 328 ± 23 | 202 | Particles - dispersed (nm); TEM |
| 7.2-10 | M3 | 20 | 0.93 ± 0.08 | 263 ± 33 | 208 | Particles - dispersed (nm); TEM |
| 7.2-11 | M4 | 20 | 1.25 ± 0.03 | 473 ± 36 | 211 (190) | Particles - aggregated in 3D-ribbon (nm); TEM |
| 7.2-12 | M5 | 10 | 0.80 ± 0.03 | 192 ± 15 | — | Particles - dispersed (nm); TEM |
| 7.2-13 | M5 | 20 | 1.07 ± 0.04 | 345 ± 29 | 199 | Particles - dispersed (nm); TEM |
| 7.2-14 | M6 | 20 | 1.29 ± 0.07 | 507 ± 54 | 197 | Particles - aggregated in 3D-ribbon (nm); TEM |
| 7.2-15 | M7 | 10 | 0.88 ± 0.07 | 236 ± 40 | 204 | — |
| 7.2-16 | M7 | 20 | 1.27 ± 0.06 | 488 ± 48 | 200 | Particles - aggregated in 3D-ribbon (nm); TEM |

The control sample (Example 7.2-1) is a fragile epoxy resin with a fracture toughness $K_{1C}$ of 0.52 MPa·m$^{0.5}$ and a high glass transition temperature of 206° C.

The fracture toughness of the resin is remarkably improved by addition of the modifier (toughening agent) of the present invention by up to 148%, while preserving the high glass transition temperature of the resin and bringing nano-structuration.

When modified with a mass fraction of 30% of PES-3 (Example 7.2-3), the high temperature cure epoxy resin is significantly toughened (the $K_{1C}$ values increases by 60%), although a significant drop in Tg is encountered (from 206° C. to 192° C.). In comparison, the addition of a mass fraction of 20% of the block copolymers of the present invention results in even higher $K_{1C}$ values, while avoiding or minimising any reduction in Tg.

None of the modifiers of the comparative examples are compatible with the epoxy resin system, and they exhibit phase separation in the resin and during its preparation.

The resins produced in the examples were also analysed by TEM, as described hereinabove, and micrographs are presented in FIGS. 1 to 3.

FIG. 1 shows a TEM of Example 7.2-13 according to the present invention. The light circles are the "islands" (phases) formed by the blocks of low Tg polymer (B), while the grey "sea" is the continuous phase of cured epoxy resin in which the blocks of polymer (A) are soluble. The larger islands have a diameter of approximately from 30 to 70 nm, while the smallest islands have a diameter of less than 20 nm.

FIG. 2 shows a TEM of Example 7.2-14. The largest islands have a diameter of approximately 20 nm, while the smallest islands have a diameter of approximately 5 nm. The islands are no longer isolated but arranged in three-dimensional ribbons.

FIG. 3 shows a TEM of Example 7.2-8. The very few large islands have a diameter of approximately 100 nm.

Figure 4:
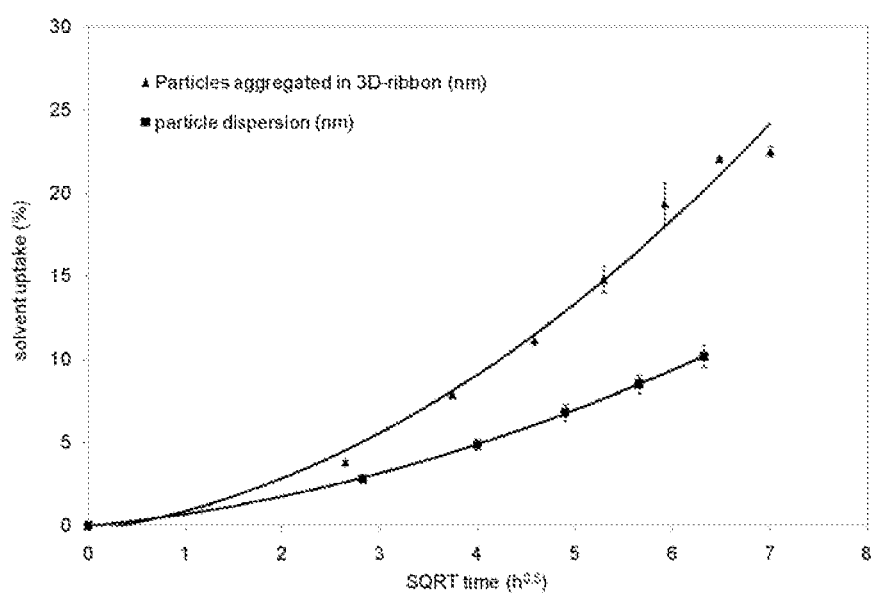
FIG. 4 is a graph showing the solvent uptake of two toughened resin systems produced according to an example.

Some of the resins were also tested for solvent resistance. FIG. 4 shows a graph which displays the solvent uptake of Example 7.2.13 (particle dispersion) and Example 7.2.14 (particles aggregated in 3D-ribbon). The data demonstrate the influence of the morphology on the fluid resistance of nano-structured epoxy resins, illustrating that while co-continuous morphology (Ex. 7.2.14) leads to higher toughness, the solvent resistance of the epoxy resin is inferior to the particle dispersion morphology (Ex. 7.2.13).

Example 7.3

High Temperature Curing Systems for Carbon Fibre Prepreg, Composite Preparation and Testing The resins used to prepare the films were mixed following the procedure described in example 7-2. They were used to impregnate a unidirectional carbon fibre tape (Besfight® G40-800, 8400 dtex, tensile strength 5.6 GPa, tensile modulus 286 GPa, intermediate modulus type from Toho Tenax), using the dual filming technique. The mass fraction of resin in the finished prepreg was 35%. Following the preparation of the prepregs, unidirectional laminates were prepared and tested for fracture toughness ($G_{1C}$) using Boeing test method BSS 7273. The laminates were cured at 180° C. for 3 hours in an autoclave in vacuum bags and under a nitrogen blanket at a pressure of 720 kPa (90 psi pressure above atmospheric pressure). The characterising data are presented in Table 4.3 below.

TABLE 4.3

Performance of high temperature curing systems for prepreg and composite preparation

| Ex. | modifier | mass fraction of modifier (%) | $G_{1C}$ (J·m$^{-2}$) | $T_g$ (°C.) | morphology |
|---|---|---|---|---|---|
| 7.3-1 | PES-3 | 30 | 315 | 194 | Homogeneous; SEM |
| 7.3-2 | M6 | 20 | 455 | 206 | Particles - aggregated in 3D-ribbon (nm); SEM |

The data in Table 4.3 demonstrate that the block copolymer toughening agents also enhance the properties of carbon fibre composites. Compared to a resin which comprises a mass fraction of 30% of PES polymer (Example 7.3-1), a mass fraction of just 20% of a block copolymer of the present invention increases the fracture toughness ($G_{1C}$) of the laminate by 44%.

The uncured pre-pregs used to prepare Examples 7.3-1 and 7.3-2 were also tested for tack properties, as described hereinabove. The dynamic viscosity of the resin used to prepare these examples was also tested, as described hereinabove. The results are presented in Table 4.4. (The overall viscosity of the resin of Example 7.3-1 is higher than the overall viscosity of the resin of Example 7.3-2 up to 90-95° C.)

TABLE 4.4

Tack properties and viscosity

| Example | modifier | mass fraction of modifier (%) | Tack at 0 days | Tack at 15 days | η at 70° C. (Pa·s) |
|---|---|---|---|---|---|
| 7.3-1 | PES 3 | 30 | Low | Low | 330 |
| 7.3-2 | M6 | 20 | High | High | 95 |

Just after manufacture of the prepreg (i.e. zero days), Example 7.3-2 is characterised by a high tack. Example 7.3-1 is characterised by a low tack. After 15 days of storage at room temperature (20° C. and 50% relative humidity), the same behaviours are observed. A high tack is measured for Example 7.3-2 while a low tack is assessed for Example 7.3-1.

The data demonstrate that not only does the block copolymer of the invention confer good tack properties to the carbon fibre prepregs, it also promotes a good retention of the tack over time.

In addition, the low viscosity of the resin of Example 7.3-2 at low temperature favours an easy preparation and better handling and lay-up of the prepreg.

Example 7.4

High Glass Transition Temperature Epoxy Resins

MY0510 (21.3 g), MY721 (40.4 g) and the toughening agent (20.00 g) were mixed at 120° C.to allow the toughening agent to fully dissolve after 1 hour of mixing. 4,4'-DDS (18.3 g) was then added to the blend and dissolved under constant vigorous mixing at 120° C. for 30 minutes. The formulated resins were cast into a mould and degassed at 90° C. for 2 to 3 hours before being cured at 180° C. for 6 hours. The compositions of the mixtures (kind and mass fraction of modifier) and the results are listed in Table 4.5 below.

TABLE 4.5

Sample Composition and Test Results

| Ex. | modifier | mass fraction (%) | $K_{IC}$ (MPa·m$^{0.5}$) | $G_{IC}$ (J·m$^{-2}$) | $T_g$ (° C.) | morphology |
|---|---|---|---|---|---|---|
| 7.4-1 | PES-3 | 20.0 | 0.63 ± 0.02 | 160 ± 23 | 240 (200) | Homogeneous |
| 7.4-2 | M6 | 20.0 | 0.81 ± 0.02 | 200 ± 10 | 240 (200) | Particulate dispersion (nm) |

The data in Table 4.5 demonstrate that the advantages of the block copolymers of the present invention are also observed in high glass transition temperature epoxy resins.

The invention claimed is:

1. A block copolymer (M) suitable for toughening a thermoset resin (R), said block copolymer (M) having one or more segments of a thermoplastic aromatic polymer (A) chemically linked to one or more segments of a low Tg polymer (B) wherein:
   (i) the low $T_g$ polymer (B) exhibits a Tg in the range of from about −130° C. to about +40° C.;
   (ii) the one or more segments of aromatic polymer (A) is soluble in uncured thermoset resin precursor(s) (P) of said thermoset resin (R),
   (iii) the one or more segments of low Tg polymer (B) is insoluble in the uncured thermoset resin precursor(s) (P),
   (iv) the aromatic polymer (A) is a polyarylsulphone comprising ether-linked repeating units, the units being selected from:

—[ArSO$_2$Ar]$_n$— and optionally from:

—[Ar]$_a$— wherein:
   Ar is phenylene;
   n=1 to 2 and can be fractional;
   a=1 to 3 and can be fractional and when a exceeds 1, said phenylene groups are linked linearly through a single chemical bond or a divalent group other than —SO$_2$—, or are fused together,
   provided that the repeating unit —[ArSO$_2$Ar]$_n$— is always present in the polyarylsulphone in such a proportion that on average at least two of said —[ArSO$_2$Ar]$_n$— units are in sequence in each polymer chain present,
   and wherein the polyarylsulphone has one or more reactive pendant or end group(s),
   (v) the low Tg polymer (B) is selected from saturated aliphatic polyesters derived from at least divalent linear, branched or cyclic aliphatic alcohols having from 2 to 60 carbon atoms, and at least divalent linear, branched or cyclic aliphatic carboxylic acids having from 3 to 60 carbon atoms, with the proviso that at least one of the alcohol or the acid components has at least 4 carbon atoms.

2. A block copolymer according to claim 1 wherein the aromatic polymer (A) has a Tg of at least 160° C.

3. A block copolymer according to claim 1, wherein at least one of the aliphatic alcohol component and the aliphatic acid component has from 20 to 60 carbon atoms.

4. A block copolymer according to claim 1, wherein the diacids are selected from dimer fatty acids having from 12 to 48 carbon atoms; and/or the alcohols are selected from dihydric alcohols having from 2 to 6 carbon atoms.

5. A block copolymer according to claim 1, wherein the one or more reactive pendant or end group(s) of the polyarylsulphone is/are amino group(s), and polymer (B) is functionalised with hydroxyl or amino groups.

6. A block copolymer according to claim 1, wherein the block copolymer (M) comprises:
   (i) the aromatic polymer (A) in a mass fraction w(A) of from 5% to 99%, and correspondingly,
   (ii) the low Tg polymer (B) in a mass fraction w(B) of from 95% to 1%,
   wherein w(A) and w(B) are calculated as $w(A)=m(A)/m(M)$ $w(B)=m(B)/m(M)$ wherein
m(A) is the mass of the aromatic polymer A;
m(B) is the mass of the low Tg polymer B; and
m(M) is the mass of the block copolymer M.

7. A block copolymer according to claim 6, wherein w(A) >w(B), and in one embodiment wherein w(A) is from 60 to 80% and w(B) is from 40 to 20%.

8. A block copolymer according to claim 1, wherein the number average molar mass $M_n$ of the block copolymer is in the range of from 3,000 to 150,000 g/mol.

9. A block copolymer according to claim 1, wherein the number average molar mass $M_n$ of the aromatic polymer (A) is in the range from 2,000 to 60,000, and the number average molar mass $M_n$ of the of the low Tg polymer (B) is in the range of from 1,000 to 30,000 g/mol.

10. A curable polymer composition comprising the block copolymer (M) of claim 1, one or more uncured thermoset resin precursors (P), and a curing agent therefor.

11. The composition of claim 10, wherein the one or more precursors (P) are selected from one or more epoxy resin precursors.

12. The composition of claim 11, wherein the epoxy resin precursors are selected from:
   (i) glycidyl ethers of bisphenol A, bisphenol F, dihydroxydiphenyl sulphone, dihydroxybenzophenone, and dihydroxy diphenyl;
   (ii) epoxy resins based on Novolacs; and
   (iii) glycidyl functional reaction products of m- or p-aminophenol, m- or p-phenylene diamine, 2,4-, 2,6- or 3,4-toluylene diamine, 3,3'- or 4,4'-diaminodiphenyl methane, and blends thereof.

13. The composition of claim 10, wherein the amount of block copolymer (M) is such that the mass fraction w(M) is from 0.5% to 40%, wherein:

$$w(M)=m(M)/m,$$

where m(M) is the mass of the block copolymer present in a toughened thermoset resin composition having the mass m.

14. A composite material comprising the curable polymer composition of claim 10 and reinforcing fibres.

* * * * *